Nov. 17, 1925.
E. L. SCHELLENS ET AL
1,562,059
RAILWAY TRUCK SPRING SUPPORT
Filed July 21, 1922
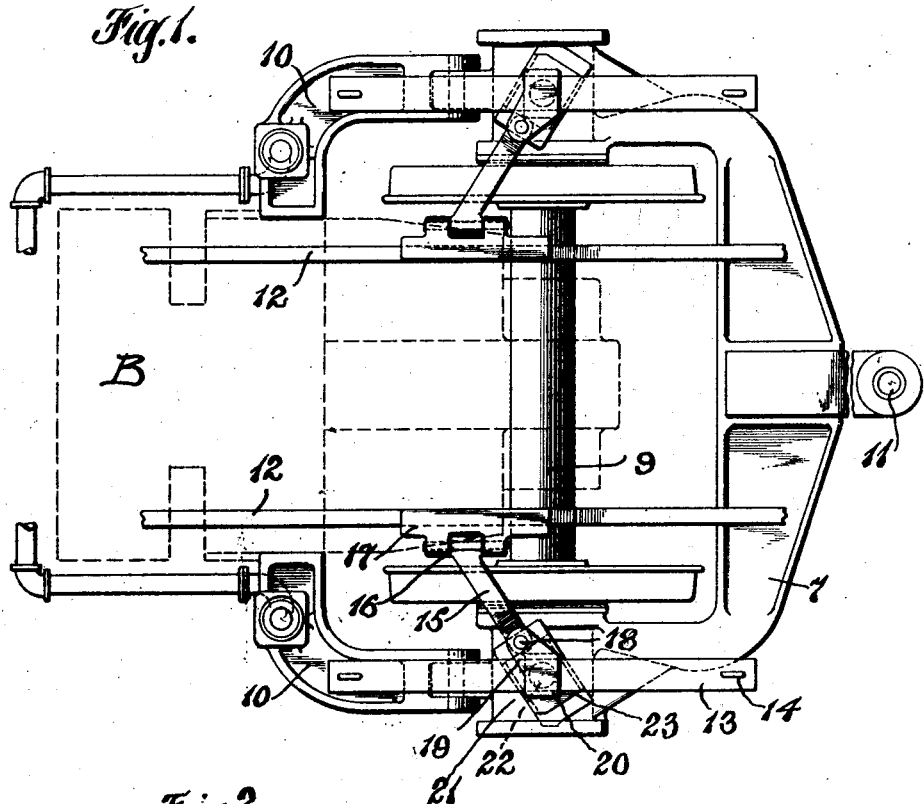
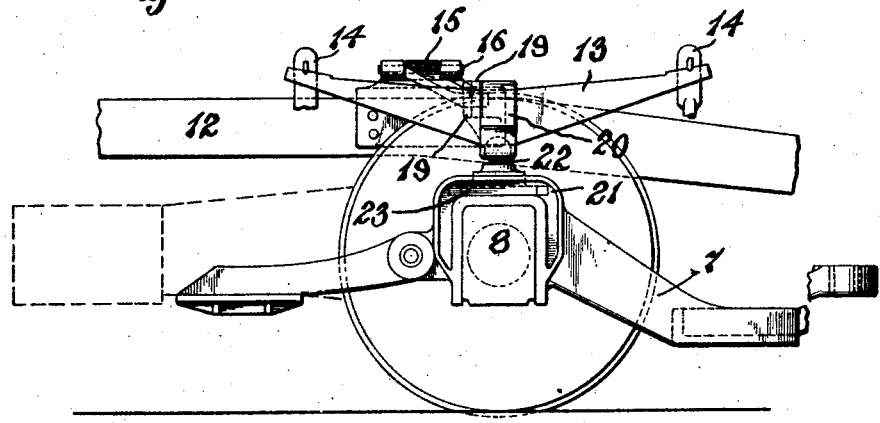
WITNESS
Gustav Genzlinger.
INVENTORS
J. S. Coffin, Jr.
E. L. Schellens
BY
ATTORNEYS Patented Nov. 17, 1925.

1,562,059

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE; SAID SCHELLENS ASSIGNOR TO SAID COFFIN, JR.

RAILWAY-TRUCK SPRING SUPPORT.

Application filed July 21, 1922. Serial No. 576,620.

*To all whom it may concern:*

Be it known that we, EUGENE L. SCHELLENS, of Pointe Claire, in the Province of Quebec, Canada, and JOEL S. COFFIN, Jr., of Lisbon, in the county of Grafton and State of New Hampshire, U. S. A., both citizens of the United States, have invented certain new and useful Improvements in Railway-Truck Spring Supports, of which the following is a specification.

This invention relates to an improved spring support for railway trucks and it is especially useful in connection with radial trucks, such for example, as the trailing truck of a locomotive, or other truck which has movement relative to the vehicle body.

One of the primary objects of our invention is the provision of a very simple, light, and effective form of spring support, capable of a wide range of application and of substitution for standard forms of spring yoke. These standard forms are of rather heavy and large construction, primarily because they are not effectively disposed. It is another of the objects of our invention to so dispose the spring support that these objections are overcome.

The foregoing, together with such other objects as may hereinafter appear, or are incident to our invention, we obtain by means of a construction, the preferred embodiments of which we have illustrated in the accompanying drawing, wherein:

Fig. 1 is a plan view of a trailing truck for a locomotive, illustrating the application of our invention; and Fig. 2 is a side elevation of Fig. 1.

Referring now to the drawing it will be seen that we have illustrated the form of truck shown and described and claimed in our copending application, Serial No. 576,617, filed July 21st, 1922. It will suffice for the purposes of this specification to point out that the truck comprises an open frame 7 for pivotal connection with the locomotive frame, such truck frame having boxes 8 in which the axle 9 is journaled; and the booster motor supporting members 10, articulated to the frame 7 and adapted to maintain the booster motor B, where a booster is applied to the truck, in alignment with the axle 9. It will be understood that in curving the truck swings relative to the locomotive structure about the pivot point 11 and also that relative vertical movement takes place.

The reference numeral 12 indicates the usual locomotive side frames, the springs being diagrammatically indicated at 13, and portions of the hangers being indicated at 14. The slip connection whereby the truck is permitted to swing will be later described.

To support the springs against distortion as the truck swings, we provide the compression bars or members 15, such members being horizontally pivotally connected at 16 to brackets 17, riveted or otherwise secured to the side frames 12; and also vertically pivotally connected at 18 to the lugs 19 formed on the spring clip 20. This spring clip embraces the springs and it will be seen that compression members 15 are tangent to the arc of swing of the truck, that is to say, tangent to a circle struck from the pivot point 11. By this arrangement, practically the only load imposed in service upon the members 15 is a compression or tension load, and thus the members may be of very light construction as compared to the standard form of spring yoke. By providing a small amount of clearance at the pivot point 16 whatever slight rocking motion of the members 15 as takes place during curving, is amply provided for. These clearances afford a slight universal motion, and all relative movements can take place without binding or distortion.

As before stated, any suitable form of slip connection may be interposed between the spring clip 20 and the pedestal saddle 21, and in the embodiment shown we have illustrated a ball 22 in the spring clip and a diagonally disposed plate 23 in the saddle. This connection permits the truck to slip with respect to the spring clips during curving.

What we claim is:

1. In combination in a locomotive, a radial truck, a spring, and a spring support comprising a compression member disposed substantially centrally of the spring.

2. In combination in a locomotive, a radial truck, a spring, and a spring support comprising a compression member disposed approximately tangent to the arc of truck swing and intermediate the ends of the spring.

3. In combination in a locomotive, a radial truck, a spring, and a spring support comprising a compression member having a pivotal connection with the locomotive structure and bracing the spring at about the middle thereof.

4. In combination in a locomotive, a radial truck, a spring, and a spring support comprising a compression member having a pivotal connection with the locomotive structure and also with the spring clip.

5. In combination in a locomotive, a radial truck, a spring, and a spring support comprising a compression member having a horizontal pivotal connection with the locomotive structure and a pivotal connection with the spring clip.

6. In combination in a locomotive, a radial truck, a spring, and a spring support comprising a compression member having a horizontal pivotal connection with the locomotive structure and a vertical pivotal connection with the spring clip.

7. In combination in a locomotive, a radial truck, a spring, and a spring support comprising a compression member having a connection permitting relative vertical and swinging movement between truck and locomotive structure and bracing the spring at about the middle thereof.

8. In combination in a locomotive, a radial truck, a spring, a spring clip, and a spring support comprising a compression member connected to the locomotive frame and clip by means permitting relative motion between truck and locomotive structure.

9. In combination in a locomotive, a radial truck, a spring, a spring clip, and a spring support comprising a compression member connected to the locomotive frame and clip by means permitting relative motion between truck and locomotive structure together with slip means between truck and clip.

In testimony whereof, we have hereunto signed our names.

E. L. SCHELLENS.
J. S. COFFIN, Jr.